United States Patent [19]

Euzarraga et al.

[11] 4,176,480
[45] Dec. 4, 1979

[54] POSTER SUPPORTING FRAME

[75] Inventors: Rosendo Euzarraga, Anaheim; Robert J. Winkler, Irvine; Robert D. Chapman, Mission Viego, all of Calif.

[73] Assignee: Fred F. Solomon, San Diego, Calif.

[21] Appl. No.: 867,834

[22] Filed: Jan. 9, 1978

[51] Int. Cl.² .............................................. G09F 1/12
[52] U.S. Cl. ...................................... 40/155; 40/156; 40/603
[58] Field of Search ..................... 40/125 G, 603, 604, 40/156, 155, 152.1; 160/392, 395

[56] References Cited

U.S. PATENT DOCUMENTS

| 1,872,682 | 8/1932 | Cockle ................................... 40/603 |
| 2,797,750 | 7/1957 | Van Dette ........................... 160/392 |
| 3,591,940 | 7/1971 | Slemmons .............................. 40/603 |
| 3,789,527 | 2/1974 | Mohr ...................................... 40/152 |
| 3,879,894 | 4/1975 | Anderson ............................. 160/395 |
| 3,979,846 | 9/1976 | Euzarraga ............................. 40/155 |

Primary Examiner—Louis G. Mancene
Assistant Examiner—Wenceslao J. Contreras
Attorney, Agent, or Firm—William C. Babcock

[57] ABSTRACT

A device for use in maintaining a poster or like sheet decorative material in a flat configuration by removably engaging narrow marginal edge portions thereof, and as a result no portion of the decorative insignia on the poster being concealed from view when supported by the device. The device when not in use may be dismantled and the components thereof stored side-by-side in a compact configuration until again needed.

3 Claims, 7 Drawing Figures

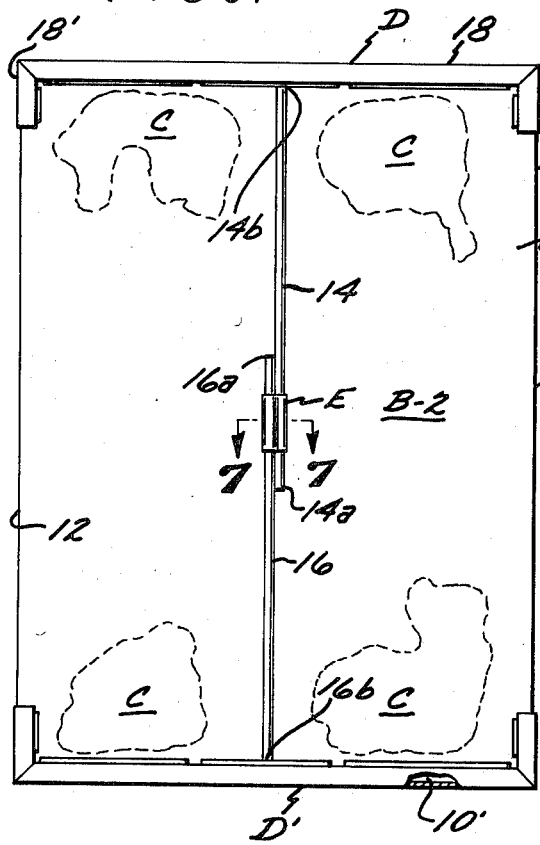
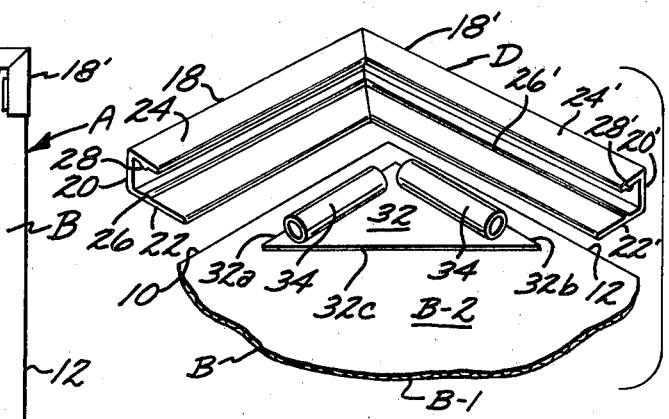
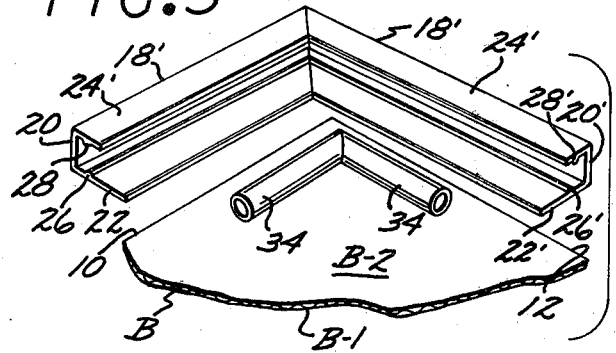
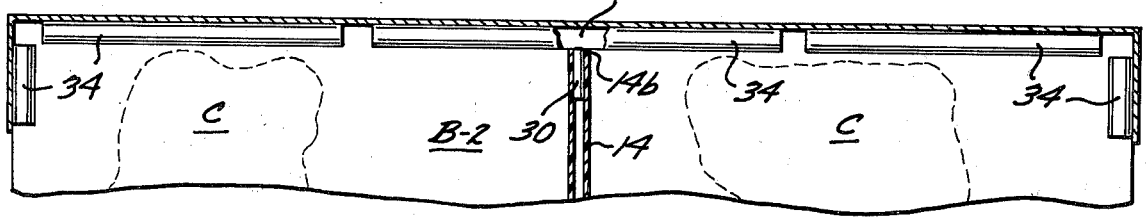
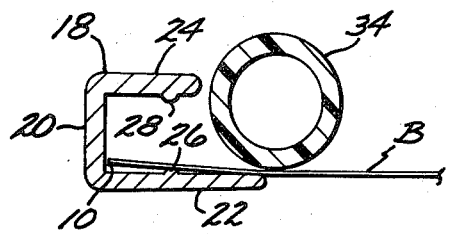
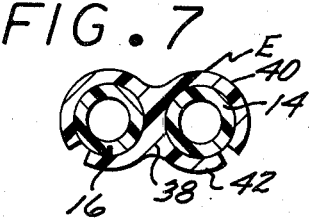
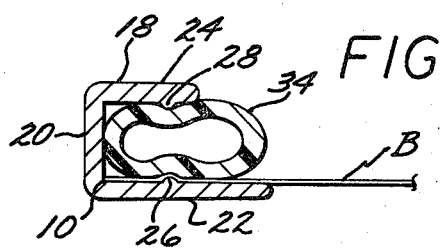

4,176,480

POSTER SUPPORTING FRAME

BACKGROUND OF THE INVENTION

1. Field of the Invention

Improved Poster Supporting Device.

2. Description of the Prior Art

In the past few years, the popularity of posters for wall decorations has increased. The supporting of posters in a flat configuration has in the past posed a problem, and this problem has normally been solved by using a heavy cumbersome frame, or taping the poster to a wall, neither of which is satisfactory. The problem of supporting a frame in a flat configuration has been partially solved by the poster supporting device disclosed and claimed in U.S. Pat. No. 3,679,846 that issued Sept. 14, 1976 to Rosendo Euzarraga, one of the joint inventors in the present application.

The prior poster supporting device disclosed and claimed in the above-identified patent operates satisfactory and holds a poster in a flat configuration, but has the operational disadvantage that upper and lower horizontal edge portions of the poster, which edge portions are of substantial width are required to lock the poster within the confines of the supporting frame. In some posters the decorative insignia thereon extends to positions close to the end edge portions of the poster, and when a poster is mounted in the prior Euzarraga device, portions of the insignia may be concealed due to the sheet material on which they are defined being utilized in locking the poster to the supporting frame.

A major object of the present invention is to supply an improved poster supporting device that is capable of supporting a poster or other sheet material in a flat configuration, and the device only requiring a relatively narrow edge portion of the poster to be engaged by the device to be held in a supporting position. Thus, posters in which a decorative insignia extend to positions close to the edge of the poster, may be supported in a flat configuration without concealing a part of the above-mentioned insignia.

SUMMARY OF THE INVENTION

A poster supporting device that may be retailed in a dismantled condition in a package that will occupy a minimum of space. The device includes first and second elongate frame end piece assemblies that preferably have mitered ends, and which end piece assemblies may be removably secured to upper and lower edge portions of the poster that are of narrow width, and as a result the end piece assemblies will not conceal any part of the insignia defined on the poster.

The first and second members that may be stiff rigid tubing or the like, have second end portions thereof that overlap. A connector is provided that adjustably engages the second end portions of the elongate members, and permits the device to be moved from a first position where the poster is loosely supported between the end frame assemblies to a second position where the poster is taut. The portion of the poster between the end frame assemblies when the device is in the second position lies in a flat plane, with all of the end edges of the poster disposed within the confines of the end frame assemblies, and parts of the side edges of the poster likewise being engaged by the portions of the end frame assembly that extend towards one another. When the device is in the second position, the major portion thereof is not visible for it is situated rearwardly of the poster.

BRIEF DESCRIPTION OF THE DRAWING

FIG. 1 is a rear elevational view of a poster having the upper and lower horizontal edge portions thereof removably engaged by the supporting device, together with vertical edge portions adjacent the upper and lower edges of the poster, with that part of the poster between the upper and lower horizontal edge portions being held in a flat plane;

FIG. 2 is a fragmentary perspective view of a mitered end portion of one of the end portion frame assemblies illustrating the channel shaped structure of the end frame assembly, together with two resilient tube members, and a triangular pressure plate, that maintains narrow edge portions of the poster in locking engagement with longitudinal protuberances that form a part of the end frame assemblies;

FIG. 3 is the same view as shown in FIG. 2, but with a notched resilient tube being used therewith, which tube is illustrated as being formed into the shape of an "L";

FIG. 4 is a vertical cross-sectional view of the upper end frame assembly illustrated in FIG. 1 that illustrates the structure thereof;

FIG. 5 is a transverse cross-sectional view of an end frame assembly, with an end edge of the poster situated therein, and the resilient tubular locking member positioned in an undeformed configuration prior to being used to lock the poster within the end frame assembly;

FIG. 6 is the same view as shown in FIG. 5, but after the locking member has been rolled into the confines of the end frame assembly to be deformed and lock an end portion of the poster within the frame assembly; and FIG. 7 is a transverse cross-sectional view of the connector taken on the line 7—7 of FIG. 1.

DESCRIPTION OF THE PREFERRED EMBODIMENT

The present poster supporting device A is adapted for use in maintaining a poster B formed from a pliable sheet material in a flat taut configuration, and without obscuring a portion of an insignia C defined on a forward surface B-1 of the poster, when the insignia extends to a position adjacent upper and lower horizontal edges 10 and 10' of the poster. The poster has a pair of laterally spaced side edges 12, and a rearward surface B-2.

Upper and lower frame assemblies D and D' are provided that are of identical structure, and which frame assemblies, as may be seen in FIG. 1, removably engage portions of the side edges 12 of the poster B and narrow marginal edge portions of the poster B adjacent the upper and lower edges 10 and 10' thereof. The poster supporting device A includes an upwardly disposed elongate vertical member 14, and a lower elongate vertical member 16, which members are parallel thereto, and have first end portions 14a and 16a that are frictionally and adjustably engaged by a connector E. The second ends 14b and 16b of the elongate members 14 and 16 removably engage the upper and lower frame assemblies D and D' as shown in FIG. 1.

The upper and lower frame assemblies D and D' are of the same structure, but reversed as to position, and accordingly only the upper frame assembly D will be described in detail. Upper frame assembly D includes an elongate member 18 of channel shaped transverse cross section that is defined by an elongate web 20, a forward flange 22, and a rearward flange 24 that is of lesser depth than the forward flange.

Elongate member 18 has mitered end portions 18' that extend a relatively short distance along the side edges 12 of poster B as may be seen in FIGS. 1, 2 and 3.

The mitered end portions 18' are the same transverse cross section as that of the elongate member 18, and the components are identified by the same numerals previously used on the elongate member 18, but with primes added thereto.

Forward and rearward flanges 20 and 22 of the end piece D and D' have longitudinally extending ribs 26 and 28 that are transversely aligned and project towards one another. The mitered end portions 18' also are provided with ribs 26' and 28' that extend longitudinally therein and lie in the same planes as the ribs 26 and 28. The rearward flanges 24 and 24' extend inwardly towards the forward flanges 22 and 22' at a slight angle as may be seen in FIG. 2. Both the upper and lower frame assemblies D and D' are formed from a resilient polymerized resin or other suitable lightweight material.

The rearward flanges 24 as can best be seen in FIG. 4 have centered pins 30 that are axially aligned and project towards one another with the pins 30 capable of removably engaging the ends 14b and 16b of the members 14 and 16 that are of tubular configuration. The poster B is mounted in the supporting device A by moving the upper and lower frame assemblies D and D' towards one another, until they are separated by a distance substantially less than the length of the poster B. A first mounting for the poster B is illustrated in FIG. 2. The upper horizontal edge and a portion of a side edge 12 are inserted in the upper frame assembly D to abut against the webs 20 and 20' and overlie the ribs 26 and 26' on the forward flange 22 and 22'. Two triangular rigid sheets 32 are provided for each of the frame assemblies D and D', with each sheet including edges 32a 32b and 32c. Each plate 32 is slid inwardly over the poster B for the edges 32a and 32b thereof to engage the interior surfaces of the webs 20 and 20'. Two lengths of stiff resilient tubing 34 are mounted on the sheet 32 as shown in FIG. 2, normally disposed to one another with the tubes thereafter being rolled inwardly to deform between the flanges 22 and 24 to the configuration shown in FIG. 6. The tubes 34 each have an external diameter substantially greater than the distance between the ribs 26 and 28 as may be seen in FIG. 6. The deformed tubes 34 serve to removably lock the poster B to the forward flanges 22 and 22' by having the plates 32 exert pressure on the poster and force it into frictional pressure contact with the ribs 26 and 26'.

A second mounting is shown in FIG. 3, in which the tubing 34 is a single length, that has a ninety-degree notch formed in the center, to permit the tubing to be formed into the L-shaped configuration shown in this figure. The poster B then has an end edge 10 and side edge 12 placed in abutting contact with the interior surface of the webs 20 and 20', with the poster overlying the ribs 26 and 26'. The tubing 34 may now be rolled into the confines of the frame assembly D to overlie the edge portion of the poster B disposed therein as shown in FIG. 6, with the tube 34 being deformed and being in pressure contact with the ribs 28, 28' and forcing the peripheral edge portions of the poster B into pressure frictional contact with the ribs 26 and 26'. The connector as may be seen in FIG. 7 is formed from a resilient polymerized material and includes a central portion 38 that has two pairs of arcuate arms 40 and 42 extending therefrom that resiliently grip the elongated members 14 and 16 to permit the members to move longitudinally in the connector to dispose the upper and lower frame assemblies D and D' in second positions of where the poster B is held in a flat taut position therebetween. It will be particularly noted that when the poster B is in a flat taut position, it is not only resiliently gripped on the marginal horizontal end edge portions thereof, but also on parts of the side edge portion. A particular advantage of the poster supporting device A is that it removably engages edge portions of the poster B that are of minimum width, and as a result, the poster when mounted in the supporting device A will not have any of the insignia C defined thereon obscured by the upper and lower frame assemblies D and D'. The poster B is removed from the upper and lower frame assemblies D and D' by reversing the mounting operation previously described in detail.

The use and operation of the invention has been described previously in detail and need not be repeated.

What is claimed is:

1. In combination with a pliable rectangular poster that has a forward surface on which decorative material is depicted, a rearward surface, and forward narrow marginal end and side edge surfaces free of said decorative material, a frame for removably supporting said poster in a flat taut condition in a vertical position, said frame of the type that includes identical upper and lower frame assemblies, means for adjustably maintaining said upper and lower frame assemblies in a first vertical spaced relationship, the improvement in each of said frame assemblies for removably gripping one of said end marginal end surfaces and portions of said marginal side surfaces adjacent thereto to support said poster in said taut condition when said frame assemblies are in said first vertical spaced relation, each of said improved frame assemblies including:

A. an elongate rigid member of channel shape transverse cross section that is defined by a web and forward and rearward flanges that extend in the same direction from the longitudinal edges thereof, a pair of transversely aligned ribs that extend towards one another from said rearward and forward flanges and are spaced a substantial distance from said web, and a pair of mitered end extensions on opposite ends of said rigid member that extend therefrom in the same direction and are of the same structure as that of said elongate member, with said poster capable of having one of said marginal end surfaces and portions of said marginal side portions disposed in said frame assembly to overlie said rearward flanges thereof; and B. a plurality of resilient tubes having diameters substantially greater than the distance between said pair of ribs, each of said resilient tubes of a length substantially less than one of said elongate, rigid members, and each of said tubes when over a marginal edge portion of said poster overlying one of said ribs and into the space between said pair of ribs being diametrically and inwardly deformed, with the inwardly deformed portion of said tube most adjacent said rearward flange pressing said marginal edge portion of said poster into pressure frictional contact with said rib projecting from said rearward flange and portions of said tubing on each side of the rearwardly and inwardly deformed portion thereof pressure and frictionally contacting said marginal edge portion to cooperate with said rib projecting from said rearward web and said rearward and inwardly deformed portion of said tube in holding said marginal edge portion of said poster in a fixed position relative to said rearward flange, and said forward diametrically and inwardly deformed portion of said tube pressure and frictionally engaging said rib on said forward flange to the extent that said tube will not slide relative to said forward flange to be inadvertently displaced therefrom.

2. An improved frame assembly as defined in claim 1 in which said rearward flange is of substantially greater depth than said forward flange.

3. An improved frame assembly as defined in claim 1 in which two of said resilient tubes have triangular shaped notches formed intermediate the ends thereof to define first and second tube portions that are rolled into adjacent interior portions of said elongate member and one of said extensions to be transversely deformed between said pair of ribs therein and force a portion of said marginal edge surface of said poster into pressure frictional engagement with said ribs on said rearward flanges, and said first and second tube portions being removably held in said frame assembly by being transversely deformed by pressure contact with said ribs on said forward flanges.

* * * * *